(12) United States Patent
Levin et al.

(10) Patent No.: US 10,943,007 B2
(45) Date of Patent: Mar. 9, 2021

(54) SYSTEM AND METHOD FOR DEFENDING APPLICATIONS INVOKING ANONYMOUS FUNCTIONS

(71) Applicant: Twistlock, Ltd., Herzliya (IL)

(72) Inventors: Liron Levin, Herzliya (IL); Dima Stopel, Herzliya (IL); John Morello, Baton Rouge, LA (US)

(73) Assignee: Twistlock, Ltd, Herzliya (IL)

( * ) Notice: Subject to any disclaimer, the term of this patent is extended or adjusted under 35 U.S.C. 154(b) by 193 days.

(21) Appl. No.: 16/134,158

(22) Filed: Sep. 18, 2018

(65) Prior Publication Data
US 2019/0087569 A1 Mar. 21, 2019

Related U.S. Application Data (60) Provisional application No. 62/560,882, filed on Sep. 20, 2017.

(51) Int. Cl.
*G06F 21/54* (2013.01)
*G06F 21/55* (2013.01)
(Continued)

(52) U.S. Cl.
CPC ............... *G06F 21/54* (2013.01); *G06F 8/00* (2013.01); *G06F 21/552* (2013.01);
(Continued)

(58) Field of Classification Search
CPC ...... G06F 21/54; G06F 21/552; G06F 21/554; G06F 21/562; G06F 21/566; G06F 8/00; G06F 9/445; G06N 20/00
(Continued)

(56) References Cited

U.S. PATENT DOCUMENTS 7,779,394 B2 * 8/2010 Homing ............... G06F 21/125
717/136
7,934,259 B1 * 4/2011 Kennedy ............... G06F 21/554
726/22
(Continued)

OTHER PUBLICATIONS

Anomalous system call detection Darren Mutz, Fredrik Valeur, Giovanni Vigana, Christopher Kruegel ACM Transaction on Information and system Security (TISSEC), vol. 9, Issue 1. Feb. 2006, pp. 61-93 (Year: 2006).*
(Continued)

*Primary Examiner* — Kambiz Zand
*Assistant Examiner* — Mohammad S Shams
(74) *Attorney, Agent, or Firm* — M&B IP Analysts, LLC (57) ABSTRACT

A system and method for defending an application configured to invoke anonymous functions. The method includes analyzing the application to determine at least one branch of the application, wherein each branch is an instruction that deviates from a default behavior of the application; identifying, based on the at least one branch of the application and at least one first anonymous function, at least one potential threat branch, each potential threat branch including a call to one of the at least one first anonymous function; and rewiring at least one first function call of the application to create a secured instance of the application, wherein each of the at least one first function call is to one of the at least one first anonymous function prior to rewiring.

15 Claims, 4 Drawing Sheets

(51) Int. Cl.
*G06F 21/56* (2013.01)
*G06N 20/00* (2019.01)
*G06F 8/00* (2018.01)
*G06F 9/445* (2018.01)

(52) U.S. Cl.
CPC .......... *G06F 21/554* (2013.01); *G06F 21/562* (2013.01); *G06F 21/566* (2013.01); *G06N 20/00* (2019.01); *G06F 9/445* (2013.01)

(58) Field of Classification Search
USPC .......................................................... 726/23
See application file for complete search history.

(56) References Cited

U.S. PATENT DOCUMENTS

| | | | | |
|---|---|---|---|---|
| 9,064,210 | B1* | 6/2015 | Hart | G06N 20/00 |
| 2007/0074169 | A1* | 3/2007 | Chess | G06F 21/54 |
| | | | | 717/126 |
| 2011/0282812 | A1* | 11/2011 | Chandramouli | G06F 9/542 |
| | | | | 706/12 |
| 2014/0074760 | A1* | 3/2014 | Boldyrev | G06F 16/254 |
| | | | | 706/12 |
| 2014/0215621 | A1* | 7/2014 | Xaypanya | H04L 63/145 |
| | | | | 726/23 |
| 2014/0283096 | A1* | 9/2014 | Neerumalla | G06F 21/54 |
| | | | | 726/26 |
| 2015/0128023 | A1* | 5/2015 | Goldstein | G06F 16/957 |
| | | | | 715/234 |
| 2015/0199310 | A1* | 7/2015 | Nakazawa | G06F 40/14 |
| | | | | 709/203 |
| 2016/0099963 | A1* | 4/2016 | Mahaffey | H04L 63/0227 |
| | | | | 726/25 |
| 2017/0251003 | A1* | 8/2017 | Rostami-Hesarsorkh | |
| | | | | H04L 63/1425 |
| 2018/0211033 | A1* | 7/2018 | Aditham | G06F 21/316 |

OTHER PUBLICATIONS

Anomaly Detection with partially Observed Anomalies Ya-Lin Zhang, Longfei Li, Jun Zhou, Xiaolong Li, Zhi-Hua Zhou WWW '18: Companion Proceedings of the web Conference 2018, pp. 639-646 (Year: 2018).*

* cited by examiner

SYSTEM AND METHOD FOR DEFENDING APPLICATIONS INVOKING ANONYMOUS FUNCTIONS

CROSS-REFERENCE TO RELATED APPLICATIONS

This application claims the benefit of U.S. Provisional Application No. 62/560,882 filed on Sep. 20, 2017, the contents of which are hereby incorporated by reference.

TECHNICAL FIELD

The present disclosure relates generally to anonymous functions, and more particularly to cyber security defense for anonymous functions.

BACKGROUND

In recent years, the growth of computing technology has resulted in the widespread adoption of use of computerized services for everyday activities. As a result, various new solutions for providing computerized services have been developed. One example of computerized services is cloud-based services, which provide program functionality via remote computing resources.

In computer programming, an anonymous function (also known as an anonymous function, a lambda expression, or a lambda abstraction) is a function definition that is not bound to an identifier. Anonymous functions may be used for short-term responses to specific events. Like containers, anonymous functions are self-descriptive and immutable. Anonymous functions may be used by other functions, for example, as arguments passed to higher-order functions or for constructing the result of a higher-order function.

A new instance of an anonymous function is executed for each event, for example, every time a user request is received. The time duration of each instance of an anonymous function is often short. A typical life-cycle of an anonymous function includes uploading of the anonymous function to the cloud by an admin, configuring the anonymous function, and invoking a new instance of the anonymous function each time a user request is received.

Anonymous functions only include code and do not require an execution engine since the execution engine is typically included in the framework for the anonymous function. Thus, the interface between user-created code of an anonymous function and the engine is smaller than the usual interface between user-created non-anonymous code and operating system.

Anonymous functions have been utilized for applications such as serverless computing. Serverless computing services have seen rapid adoption in recent years. An example serverless computing service that utilizes anonymous functions is Amazon Web Services (AWS). AWS provides execution of code without requiring that the code owner provision or manage servers. Other examples of serverless frameworks include Google Cloud Functions and Azure Functions.

As a result of the rapid growth in computerized services and, in particular, serverless computing services, such services have become targets for hackers and other malicious entities. Consequently, methods for detecting and mitigating cyber threats to such services, as well as the applications and functions used to provide such services.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for defending an application configured to invoke at least one first anonymous function. The method comprises: analyzing the application to determine at least one branch of the application, wherein each branch is an instruction that deviates from a default behavior of the application; identifying, based on the at least one branch of the application and at least one first anonymous function, at least one potential threat branch, each potential threat branch including a call to one of the at least one first anonymous function; and rewiring at least one first function call of the application to create a secured instance of the application, wherein each of the at least one first function call is to one of the at least one first anonymous function prior to rewiring.

Certain embodiments disclosed herein also include a non-transitory computer readable medium having stored thereon causing a processing circuitry to execute a process, the process comprising: analyzing the application to determine at least one branch of the application, wherein each branch is an instruction that deviates from a default behavior of the application; identifying, based on the at least one branch of the application and at least one first anonymous function, at least one potential threat branch, each potential threat branch including a call to one of the at least one first anonymous function; and rewiring at least one first function call of the application to create a secured instance of the application, wherein each of the at least one first function call is to one of the at least one first anonymous function prior to rewiring.

Certain embodiments disclosed herein also include a system for defending an application configured to invoke at least one first anonymous function. The system comprises: a processing circuitry; and a memory, the memory containing instructions that, when executed by the processing circuitry, configure the system to: analyze the application to determine at least one branch of the application, wherein each branch is an instruction that deviates from a default behavior of the application; identify, based on the at least one branch of the application and at least one first anonymous function, at least one potential threat branch, each potential threat branch including a call to one of the at least one first anonymous function; and rewire at least one first function call of the application to create a secured instance of the application, wherein each of the at least one first function call is to one of the at least one first anonymous function prior to rewiring.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 1 is a network diagram utilized to describe the various disclosed embodiments.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Due to the potential security threats that may affect applications, it is desirable to provide techniques for increasing security of the applications. In particular, for applications that invoke anonymous functions, calls to compromised or otherwise insecure anonymous functions may result in unnecessarily insecure activity. For example, if an anonymous function is compromised (e.g., by modifying the anonymous function to alter its behavior during execution), the compromised function may be used to steal information provided through user inputs (e.g., login credentials or other information about the user) to the compromised function.

To address the aforementioned security issues, the various disclosed embodiments include a method and system for defending an application that invokes anonymous functions. In an example implementation, the application is a serverless application invoking anonymous functions. Each anonymous function is a function that is not bound to an identifier. One or more anonymous functions to be invoked by an unsecured application are retrieved from function repositories. The retrieved anonymous functions are analyzed in order to determine branches of the unsecured application with respect to at least the anonymous functions. The analysis may include, but is not limited to, static analysis, request simulations, or both. One or more potential threat branches are identified among the branches of the unsecured application. The potential threat branches include functions that may cause risky or otherwise unsecure actions to be performed.

Based on the potential threat branches, a secured application is created. Creating the secured application includes rewiring one or more function calls, where each rewired function call invokes a substitute function that is different than the respective unmodified function call of the unsecured application. Each unmodified function call that is rewired is a call to a function of one of the potential threat branches. The substitute function may be a security anonymous function configured to monitor for unexpected flows and may be further configured to call the original anonymous function if, for example, no unsecure activity is detected. Thus, the rewired function calls allow for detecting and mitigating anomalous activity per anonymous function that may be invoked by the application. The secured application may further be configured to sanitize inputs (e.g., user requests). The secured application is uploaded to the repository.

In some implementations, each anonymous function input is wrapped with each library that communicates with outputs of the anonymous function to associate the inputs and corresponding wrapped outputs. The inputs may include entry points that trigger the anonymous function, while the outputs may include external resources (e.g., external to the application that invokes the anonymous function) utilized by the anonymous function. The wrapped inputs and libraries are monitored to detect anomalous behavior of the anonymous function. Wrapping the inputs and corresponding outputs allows for learning correlations between such inputs and outputs, thereby allowing for efficiently identifying anomalies when functions display behavior that does not follow normal input/output patterns.

When anomalous behavior is detected, mitigation actions may be performed. For example, anomalous behavior may include an unexpected output based on the input to the anonymous function. In response to the anomaly, the output may be blocked, thereby mitigating a potential cyber threat.

As a non-limiting example, based on previous invocations of an anonymous function, a pattern including querying a user table in a database being performed in response to query for all users (e.g., via a "GET users" request) is determined. Subsequent inputs and outputs may be monitored to identify deviations from this pattern. For example, if an input query "GET users" results in the anonymous function outputting a query to a table other than the user table (e.g., "groups"), an anomaly may be detected. In response to the anomaly, the anomalous query may be blocked, an alert may be raised, and the like.

In an embodiment, a machine learning model may be trained using the anonymous function inputs, anonymous function outputs, one or more characteristics of the anonymous function, or a combination thereof. The machine learning model outputs anomalies that represent deviations from normal behavior of the anonymous function and, thus, indicate potential cyber threats.

In some implementations, the anomalous behavior may be aggregated. The aggregated anomalous behavior may be sent, for example, to a centralized console via a secured channel. Forensics data based on these anomalous behaviors may be aggregated (e.g., per incident) and may be retrieved on demand.

The disclosed embodiments allow for identifying potentially unsecure anonymous function calls and automatically replacing calls to such unsecure anonymous functions with known secure functions. Thus, the disclosed embodiments provide techniques for improving security in applications invoking anonymous functions. Also, since instances of anonymous functions are typically used for single transactions (i.e., user sessions) as opposed to longer running services, correlations between inputs and outputs of anonymous functions may be learned. By learning correlations between inputs and outputs of anonymous functions, the disclosed embodiments allow for detecting anomalous behavior including anomalous outputs with respect to inputs. Further, in some implementations, calls to unsecure anonymous functions may be rewired to be replaced with calls to substitute functions that further increase security by altering operation of the substitute functions in response to anomalous or otherwise potentially unsecure behavior.

Figure 1:
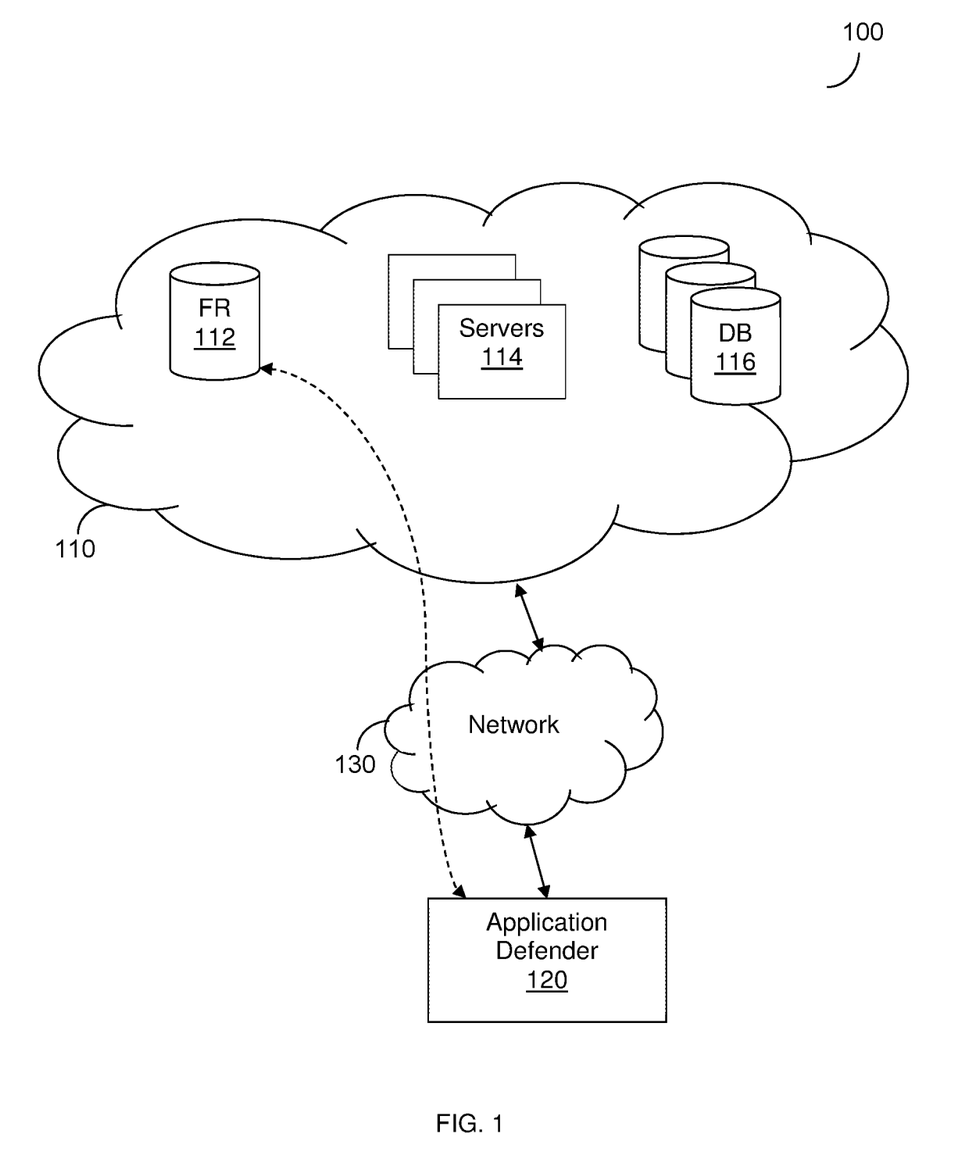

FIG. 1 is an example network diagram 100 utilized to describe the various disclosed embodiments. The network diagram 100 illustrates a cloud environment 110 communicating with an application defender 120 via a network 130. The network 130 may be, but is not limited to, a wireless, cellular or wired network, a local area network (LAN), a wide area network (WAN), a metro area network (MAN), the Internet, the worldwide web (WWW), similar networks, and any combination thereof.

One or more serverless applications may be implemented via the cloud environment 110. To this end, the cloud environment 110 may include, but is not limited to, a function repository (FR) 112, one or more servers 114, and one or more databases (DBs) 116. The function repository 112 stores functions including, but not limited to, anonymous functions to be invoked by applications executed or hosted by the servers 114 and utilizing data (e.g., files, libraries, etc.) stored in the databases 116. The functions stored in the function repository 112 may be uploaded by users via user devices (not shown).

In an embodiment, the application defender 120 is configured to retrieve the anonymous functions stored in the function repository 112 and to analyze the application code of an application stored in the servers 114 with respect to anonymous functions called by the application to determine branches of the application. Based on the determined branches, the application defender 120 is configured to identify one or more potential threat branches that may cause unsecured activities by the application. For example, potential threat branches may include functions that would cause writing to a disk or querying of a network.

In an embodiment, the application defender 120 is configured to create a secured application based on the potential threat branches and the unsecured application (i.e., the application prior to modification according to the disclosed embodiments) and to send the secured application for use (e.g., by uploading the secured application to one or more of the servers 114). To this end, the application is rewired to include one or more rewired function calls to substitute functions that differ from the respective anonymous functions invoked by the unsecured application. As a non-limiting example, a function call to the function "openfile" may be replaced with a function call to the substitute function "modified.openfile." The substitute functions may be configured to trigger in response to potentially unsecure flows such as, but not limited to, long execution cycles (e.g., occurring above a threshold time period), inconsistent flows, calling of new engine methods, and the like.

The secured application allows for improved security and defense against cyber threats. Specifically, by analyzing branches of the application and determining their potentially unsecure execution results, calls to anonymous functions of the application may be rewired to substitute functions that are configured to detect and mitigate threats, thereby resulting in increased security for the application. Further, since the substitute functions may be configured to trigger in response to anomalous or otherwise potentially unsecure behavior.

In an embodiment, the application defender 120 is further configured to generate one or more of the substitute functions, to select one or more of the substitute functions from a predetermined set of existing functions, or a combination thereof, and to store the substitute functions in the function repository 112. As noted above, the substitute functions may be triggered in response to unexpected flows. The secured application is rewired such that calls to potentially unsecure original anonymous functions instead call the respective substitute functions stored in the function repository 112.

In some implementations, one or more of the rewired function calls may call an external service (not shown), i.e., a service that is external to the secured application and is configured to detect potential threats, mitigate potential threats, or both. The external service may, for example, check each input to the respective function for potential threats. The external service may be, but is not limited to, an application available via the Internet. Thus, the rewired function calls may call services that are operated by other entities, thereby allowing for, e.g., reduced usage of computing resources related to processing inputs and storing instructions, as well as increased security via updates of the external services with fewer updates to the secured application itself.

In an embodiment, the application defender 120 may be further configured to wrap each input and output of each anonymous function, to learn correlations between inputs and outputs of each anonymous function, and to detect anomalies based on the learned correlations. The anonymous function inputs include entry points that trigger the anonymous function such as, but not limited to, an HTTP "GET users" request. The anonymous function outputs include functions that call external resources (e.g., external to the application code) that is utilized by an anonymous function such as, but not limited to, a file, library or other database, and the like.

In a further embodiment, the application defender 120 may be configured to train a machine learning model using a training set including anonymous function inputs, outputs, and characteristics of anomalous functions (e.g., identifiers of anomalous functions). The trained model is an anomaly detection model for detecting deviations from normal behavior using anonymous function inputs, anonymous function outputs, and anonymous function characteristics as features in order to output anomalies.

Wrapping the inputs and outputs of the anonymous functions allows for accurate detection of anomalies by identifying patterns between inputs and their respective outputs. Further, because each anonymous function serves a single transaction (i.e., user session), each set of one or more inputs of the function corresponds to a respective set of one or more outputs, thereby allowing for learning correlations between inputs and corresponding outputs. Accordingly, the inputs and outputs of particular anonymous functions may be utilized for more accurate machine learning of anomalous behavior and, consequently, more accurate detections of anomalies.

In an embodiment, the application defender 120 may be further configured to perform an efficient feedback loop process in order to provide more accurate and efficient training. In this regard, it has been identified that the main difficulties in performing machine learning for anonymous functions (e.g., lambdas) is the short duration of each invocation. In some cases, it is difficult to even establish bi-directional communication between the function and the management console within the time duration of the invocation (e.g., to send model data, policies, and events). Thus, potential training data may be lost in some instances, leading to longer training periods and less accurate models.

As an example, to improve accuracy of machine learning models trained for lambda functions, the efficient feedback loop process used may be as follows. Training data may be written to a standard format (e.g., the lambda standard output) that is efficient and supported by any relevant cloud provider. Cloud provider data may be aggregated to create strict function profiles for the anonymous functions. Once the machine learning model is ready, a new anonymous function version including the respective created strict function profile is uploaded, and a policy may be embedded within the anonymous function instead of sending the policy each time the function is invoked.

Figure 2:
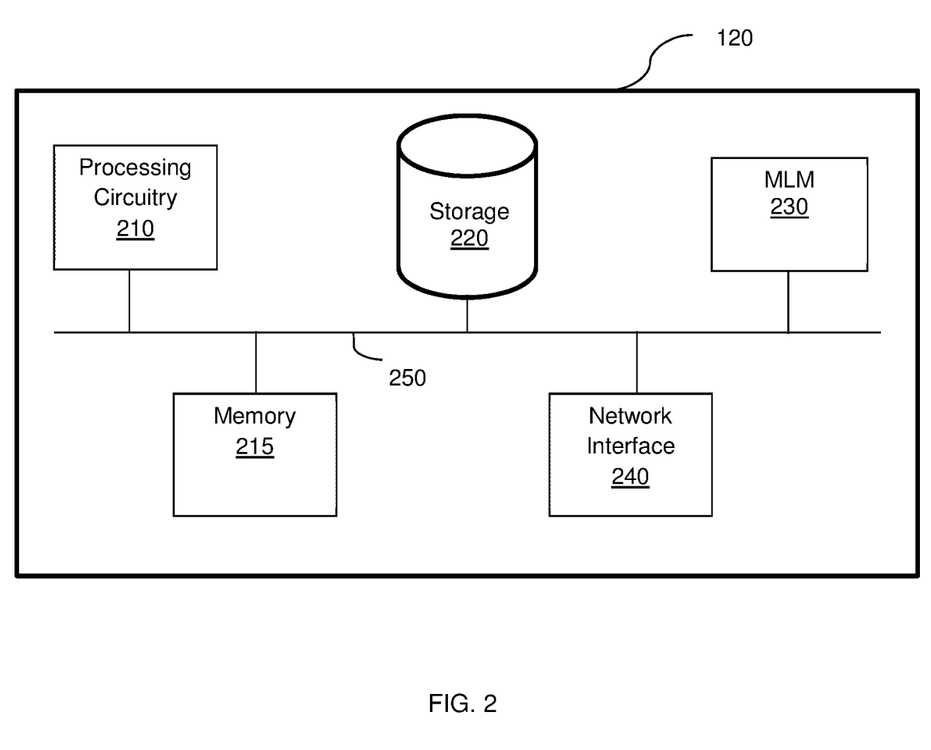
FIG. 2 is a schematic diagram illustrating an application defender according to an embodiment.

FIG. 2 is an example schematic diagram illustrating the application defender 120 according to an embodiment. The application defender 120 includes a processing circuitry 210 coupled to a memory 215, a storage 220, and a network interface 240. In an embodiment, the application defender 120 may include a machine learning module (MLM) 230. The components of the application defender 120 may be communicatively connected via a bus 250.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 215 may be volatile (e.g., RAM, etc.), non-volatile (e.g., ROM, flash memory, etc.), or a combination thereof. In one configuration, computer readable instructions to implement one or more embodiments disclosed herein may be stored in the storage 220.

In another embodiment, the memory 215 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to perform the various processes described herein. Specifically, the instructions, when executed, cause the processing circuitry 210 to perform the embodiments described herein.

The storage 220 may be magnetic storage, optical storage, and the like, and may be realized, for example, as flash memory or other memory technology, CD-ROM, Digital Versatile Disks (DVDs), or any other medium which can be used to store the desired information.

The machine learning module 230 is configured to detect anomalies based on features including anonymous function inputs, anonymous function outputs, and characteristics of an anonymous function. To this end, the machine learning module 230 may be configured to train a machine learning model using a training set including such inputs, outputs, and characteristics. The machine learning module 230 is further configured to apply the machine learning model to anonymous function inputs, outputs, and characteristics, in order to detect anomalies.

The estimation of the detection model may be performed preliminarily. In an embodiment, machine learning module 230 may be further configured to perform testing, validation, or both, on the prediction model to refine the model, validate the model, or both.

The network interface 240 allows the application defender 120 to communicate with the function repository 112, the servers 114, the databases 116, or a combination of, for the purpose of, for example, retrieving anonymous functions, retrieving application code, and the like.

It should be understood that the embodiments described herein are not limited to the specific architecture illustrated in FIG. 2, and that other architectures may be equally used without departing from the scope of the disclosed embodiments. Further, the machine learning module may be included in a system that is external to the application defender 120 without departing from the scope of the disclosure and such external machine learning module may be configured to communicate with the application defender 120 to receive features to be used for machine learning and to send machine learning models trained based on those features.

It should also be noted that the application defender 120 is depicted as a system in FIGS. 1 and 2 merely for example purposes and without limitation on the disclosed embodiments. In another embodiment, the application defender may be implemented as a software container executed on a host device. An example hardware layer of a host device that may be configured to execute the defender software container is described further herein below with respect to FIG. 4.

Figure 3:
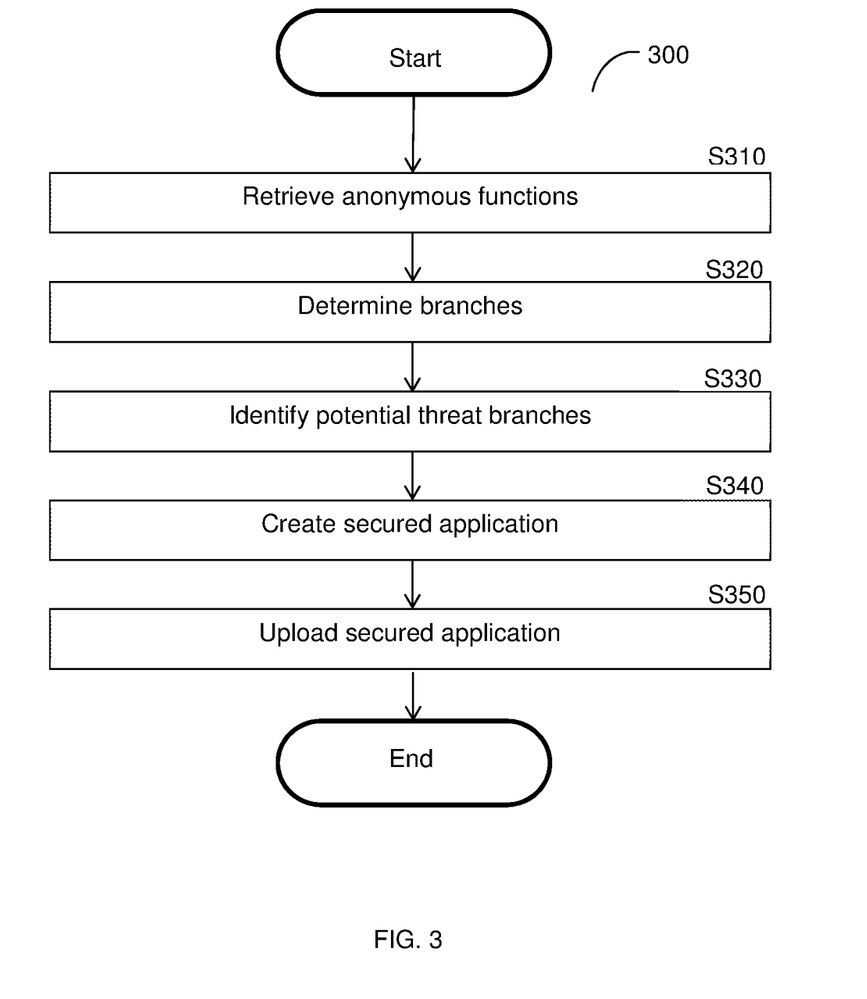
FIG. 3 is a flowchart illustrating a method for defending an application invoking anonymous functions according to an embodiment.

FIG. 3 is an example flowchart 300 illustrating a method for defending an application that invokes anonymous functions according to an embodiment. In an example implementation, the application is a serverless application including calls to anonymous functions used for single transactions.

At S310, anonymous functions are retrieved. The anonymous functions may be retrieved from one or more function repositories storing such functions. To this end, S310 may include scanning the function repositories and downloading all anonymous functions identified during the scan.

At S320, an application that invokes one or more anonymous functions is analyzed to determine one or more branches of the application. In an embodiment, S320 may include static analysis of the application code, dynamic request simulation for the application, or both. Each branch is an instruction of the application that can cause deviation from a default behavior of the application (e.g., calling a function other than a default function).

The dynamic request simulation may include uploading a test-secured application that is configured to collect data related to requests. The test-secured application may include rewired function calls to substitute functions that are configured to collect data, for example related to requests. Thus, the collected data may be analyzed to identify features of requests that may indicate potential threats. The data collection may be performed progressively over time as new requests are received.

At S330, based on the determined branches, one or more potential threat branches is identified. The potential threat branches may result in deviations from the default behavior of the application that are potentially unsecure. The potential threat branches may be identified based on a predetermined set of potential threat branch definitions. The potential threat branch definitions may include, for example, actions to be performed by the application that may expose the application to vulnerabilities. As a non-limiting example, potential threat branches may result in writing to a disk or querying an external network.

In an embodiment, the application analysis includes dynamic request simulation. To this end, in such an embodiment, S330 may include analyzing the data collected via the dynamic request simulation. The analysis may be performed offline after data is collected. In some implementations, the analysis may be performed iteratively as additional data is collected, for example at predetermined time intervals, when a threshold amount of new data has been collected, when a threshold number of new requests has been received, and the like.

At S340, based on the identified potential threat branches, a secured application is created. The secured application includes one or more rewired function calls to substitute functions that act as an anonymous function shield by modifying behavior of the application with respect to one or more of its anonymous functions. The substitute functions may trigger in response to unexpected flows or other anomalous behavior, which may be defined in a predetermined list of anomalous activities, determined based on learned correlations between inputs and outputs for anonymous functions, or a combination thereof.

The predetermined list of anomalous activities may include, but is not limited to, a function running an unexpected process, a function receiving or sending a set of network packets containing an attack as a content, a function sending a network request or response to an address associated with malware or otherwise behavior, a function communicating with an internal service it is not supposed to communicate with, a function deviating from known permissions, a combination thereof, and the like.

Specifically, with respect to deviations from known permissions, in most frameworks (for example AWS Lambda), each function has a predefined permissions set such as, for example, read access only for objects stored in a specific region. These permissions may be analyzed in advance of execution of the function, therefore allowing for notifying or blocking when a deviation occurs at runtime. In an example implementation, a mapping may be created (e.g., between <service, region> and <ip, port, dns> for read access to objects stored in specific regions), and outgoing network requests may be tracked to detect deviations. To this end, S340 may further include static analysis of a permissions set for each function used by the identified potential threat branches such that the unexpected flows are defined to include deviations from the respective permissions sets.

Each rewired function call may replace an existing function call of the application that is invoked in one of the identified potential threat branches. As a non-limiting example, if a potential threat branches includes calling a node engine method "openfile," the function call may be rewired to invoke a substitute function "security.openfile" which is configured to trigger in response to anomalous behavior. Accordingly, the rewired function calls may also sanitize inputs such as user requests.

The anomalous behavior may be detected via a machine learning model trained using a training set including anonymous function inputs, outputs, and characteristics. To this end, creating the secured application may further include configuring the application to apply the machine learning model to test inputs, outputs, and characteristics, in order to detect anomalous behavior. In an embodiment, the machine learning model may be trained using an efficient feedback loop process as described herein above. This provides low overhead for learning but consistent security, even during network issues.

Creating the secured application may include generating or retrieving identifiers of one or more of the substitute functions from one or more data sources including anonymous functions. The data sources may include data repositories storing anonymous functions (e.g., the function repository 112, FIG. 1). In some implementations, S340 may include retrieving the substitute functions from one or more of the data sources.

In another embodiment, the application may be secured based further on wrappings of inputs with corresponding outputs. The substitute functions may be triggered when unexpected input and output combinations occur with respect to one of the anonymous functions. Accordingly, during execution of the application including the rewired function calls, anomalous pairings of inputs and outputs may be detected and mitigated.

At S350, the created secured application is stored in, for example, a database accessible to a server (e.g., the DB 116 accessible to the server 114, FIG. 1). In an embodiment, S350 may also include storing the substitute functions in the function repository. The application, when executed, calls the substitute functions rather than the original anonymous functions of the potential threat branches, thereby mitigating unsecure function calls.

It should be noted that various embodiments are discussed with respect to serverless applications invoking anonymous functions merely for simplicity purposes and without limiting the disclosed embodiments. Non-serverless applications that invoke anonymous functions and, in particular, anonymous functions invoking single transactions, may be equally defended without departing from the scope of the disclosure. Additionally, applications defended according to the disclosed embodiments may equally utilize serverless features in combination with containers, for example by containerizing anonymous functions utilized by the application.

It should also be noted that the order of steps shown in FIG. 3 are shown in an example order and that at least some steps may be performed in a different order. For example, an application may be analyzed to determine branches thereof (S320) prior to retrieving anonymous functions (S310) without departing from the scope of the disclosure.

Figure 4:
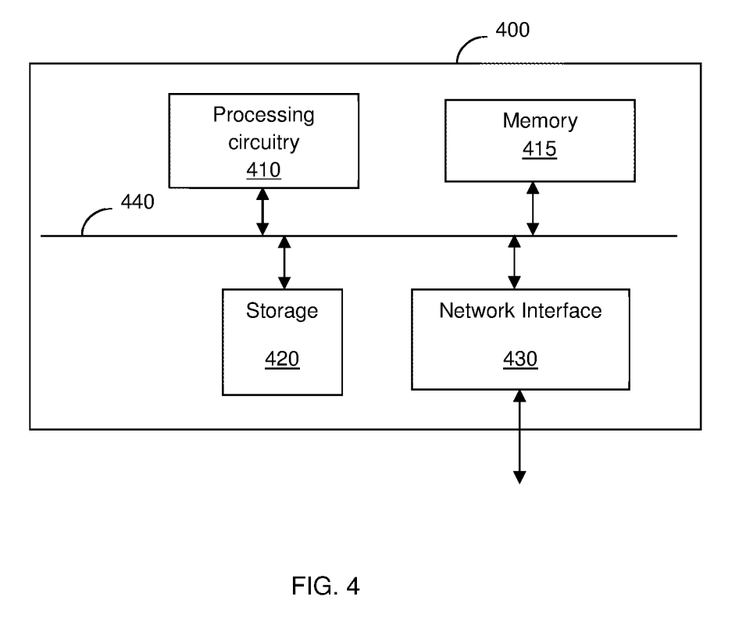
FIG. 4 is a schematic diagram of a hardware layer of a host device configured to execute a defender container according to an embodiment.

FIG. 4 is an example schematic diagram of a hardware layer of a host device 400 that may be configured to execute an application defender as a software container according to an embodiment. In an embodiment, the host device 400 includes a processing circuitry 410, a memory 415, a storage 420, and a network interface 430, all connected to a computer bus 440.

The processing circuitry 410 may be realized by one or more hardware logic components and circuits. For example, and without limitation, illustrative types of hardware logic components that can be used include Field Programmable Gate Arrays (FPGAs), Application-specific Integrated Circuits (ASICs), System-on-a-chip systems (SOCs), Complex Programmable Logic Devices (CPLDs), general-purpose microprocessors, microcontrollers, digital signal processors (DSPs), and the like, or any other hardware logic components that can perform calculations or other manipulations of information. The memory 415 may be volatile, non-volatile, or a combination thereof. The storage 420 may be magnetic storage, optical storage, and the like.

In one configuration, computer readable instructions to implement one or more embodiments disclosed herein may be stored in the storage 420. The storage 420 may also store other computer readable instructions to implement an operating system, an application program, and the like. Computer readable instructions may be loaded in the memory for execution by the processing circuitry 410.

In another embodiment, the storage 420, the memory 415, or both, are configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 410 to perform the various functions described herein with respect to at least detection of vulnerabilities.

The network interface 430 allows communication with other external systems or host devices through a network (not shown) The network interface 430 may include a wired connection or a wireless connection. The network interface 430 may transmit communication media, receive communication media, or both. The computer bus 440 may be, for example, a PCIe bus.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A method for defending an application configured to invoke anonymous functions, comprising:
    analyzing the application to determine at least one branch of the application, wherein each branch is an instruction that deviates from a default behavior of the application;
    identifying, based on the at least one branch of the application and at least one first anonymous function, at least one potential threat branch, each potential threat branch including a call to one of the at least one first anonymous function; and
    rewiring at least one first function call of the application to create a secured instance of the application, wherein each of the at least one first function call is to one of the at least one first anonymous function prior to rewiring, wherein rewiring the at least one first function call further comprises replacing each of the at least one first function call with at least one second function call, wherein each second function call is to one of at least one second anonymous function, wherein each of the at least one second anonymous function is triggered in response to potentially unsecured flows by the secured application, wherein each of the at least one second anonymous function is triggered when anomalous behavior has occurred, wherein the secured instance of the application is configured to detect the anomalous behavior based on inputs, outputs, and characteristics of each anonymous function.

2. The method of claim 1, wherein the potentially unsecured flows include at least one of: long execution cycles, inconsistent flows, and calling new engine methods.

3. The method of claim 1, wherein the secured application is configured to apply a machine learning model for detecting the anomalous behavior, wherein the machine learning model is trained using a training set including training anonymous function inputs, training anonymous function outputs, and training anonymous function characteristics.

4. The method of claim 1, wherein the anomalous behavior includes an anomalous input and output combination, wherein the anomalous input and output combination deviates from a wrapping of an anonymous function input with a corresponding anonymous function output.

5. The method of claim 1, wherein analyzing the application further comprises at least one of: static analysis, and dynamic request simulations.

6. The method of claim 1, wherein the application is a serverless application.

7. The method of claim 1, wherein each anonymous function is a function that is not bound to an identifier.

8. A non-transitory computer readable medium having stored thereon instructions for causing a processing circuitry to execute a process, the process comprising:
    analyzing the application to determine at least one branch of the application, wherein each branch is an instruction that deviates from a default behavior of the application;
    identifying, based on the at least one branch of the application and the at least one first anonymous function, at least one potential threat branch, each potential threat branch including a call to one of the at least one first anonymous function; and
    rewiring at least one first function call of the application to create a secured instance of the application, wherein each of the at least one first function call is to one of the at least one first anonymous function prior to rewiring, wherein rewiring the at least one first function call further comprises replacing each of the at least one first function call with at least one second function call, wherein each second function call is to one of at least one second anonymous function, wherein rewiring the at least one first function call further comprises replacing each of the at least one first function call with at least one second function call, wherein each second function call is to one of at least one second anonymous function, wherein each of the at least one second anonymous function is triggered in response to potentially unsecured flows by the secured application, wherein each of the at least one second anonymous function is triggered when anomalous behavior has occurred, wherein the secured instance of the application is configured to detect the anomalous behavior based on inputs, outputs, and characteristics of each anonymous function.

9. A system for defending an application configured to invoke anonymous functions, comprising:
a processing circuitry; and
a memory, the memory containing instructions that, when executed by the processing circuitry, configure the system to:
analyze the application to determine at least one branch of the application, wherein each branch is an instruction that deviates from a default behavior of the application;
identify, based on the at least one branch of the application and the at least one first anonymous function, at least one potential threat branch, each potential threat branch including a call to one of the at least one first anonymous function; and
rewire at least one first function call of the application to create a secured instance of the application, wherein each of the at least one first function call is to one of the at least one first anonymous function prior to rewiring, wherein rewiring the at least one first function call further comprises replacing each of the at least one first function call with at least one second function call, wherein each second function call is to one of at least one second anonymous function, wherein rewiring the at least one first function call further comprises replacing each of the at least one first function call with at least one second function call, wherein each second function call is to one of at least one second anonymous function, wherein each of the at least one second anonymous function is triggered in response to potentially unsecured flows by the secured application, wherein each of the at least one second anonymous function is triggered when anomalous behavior has occurred, wherein the secured instance of the application is configured to detect the anomalous behavior based on inputs, outputs, and characteristics of each anonymous function.

10. The system of claim 9, wherein the potentially unsecured flows include at least one of: long execution cycles, inconsistent flows, and calling new engine methods.

11. The system of claim 9, wherein the secured application is configured to apply a machine learning model for detecting the anomalous behavior, wherein the machine learning model is trained using a training set including training anonymous function inputs, training anonymous function outputs, and training anonymous function characteristics.

12. The system of claim 9, wherein the anomalous behavior includes an anomalous input and output combination, wherein the anomalous input and output combination deviates from a wrapping of an anonymous function input with a corresponding anonymous function output.

13. The system of claim 9, wherein analyzing the application further comprises at least one of: static analysis, and dynamic request simulations.

14. The system of claim 9, wherein the application is a serverless application.

15. The system of claim 9, wherein each anonymous function is not bound to an identifier.

* * * * *